United States Patent [19]

Kobayashi et al.

[11] Patent Number: 5,473,239
[45] Date of Patent: Dec. 5, 1995

[54] CAPSTAN MOTOR DRIVE CONTROL DEVICE

[75] Inventors: Yoshinori Kobayashi, Tokyo; Ryuji Watanabe, Kanagawa, both of Japan

[73] Assignee: Sony Corporation, Tokyo, Japan

[21] Appl. No.: 151,347

[22] Filed: Nov. 12, 1993

[30] Foreign Application Priority Data

Nov. 13, 1992 [JP] Japan .................................. 4-303845
Nov. 13, 1992 [JP] Japan .................................. 4-303846

[51] Int. Cl.⁶ ................................................... H02P 5/28
[52] U.S. Cl. ......................... 318/798; 318/799; 318/807; 388/805
[58] Field of Search ................................ 318/798, 799, 318/807, 503; 388/805

[56] References Cited

U.S. PATENT DOCUMENTS 4,992,715  2/1991  Nakamura et al. .................... 318/798

Primary Examiner—William M. Shoop, Jr.
Assistant Examiner—Karen Masih
Attorney, Agent, or Firm—Jay H. Maioli

[57] ABSTRACT

A capstan motor is controlled by a signal derived from a frequency generator that has been converted to a voltage that reflects the instantaneous change in velocity of the rotating motor. Acceleration of the motor is found by using a mean velocity obtained as a reciprocal of the pulsed signal from the frequency generator and then estimating the instantaneous velocity based on the derived acceleration. The estimated instantaneous velocity is converted to a drive voltage for the capstan motor so that the motor can be started and stopped with a respective constant acceleration and deceleration.

7 Claims, 7 Drawing Sheets

CAPSTAN MOTOR DRIVE CONTROL DEVICE

BACKGROUND OF THE INVENTION

1. Field of the Invention

This invention relates generally to a capstan motor drive control device that involves translating frequency signals into voltage signals and detecting the signal frequency and, more specifically, to a velocity detection device for translating frequency signals related to the speed of a moving object into voltage signals for detecting the moving velocity, as particularly applied to a tape drive system for a tape recorder.

2. Description of the Background

A typical tape drive system for a video tape recorder is shown in FIG. 10 and includes a capstan motor 20 consisting of a three-phase brushless DC motor. A driving circuit 21 causes three-phase currents proportional to an analog control voltage Vs to flow through the three u, v, and w phase coils to generate a torque in the capstan motor 20 and cause rotation of the capstan.

The rotational angular positions of the rotor (not shown) of the capstan motor 20 are detected by Hall devices 23. The position information as detected by these Hall devices 23 is fed back to the driving circuit 21 for changing over the currents flowing through the u, v, and w phase windings.

For detecting the angular velocity of the capstan motor 20, a so-called frequency generator FG made up of a magnet formed by magnetizing the outer periphery of a rotating part of the capstan motor and a magnetic reluctance (MR) sensor 24 arranged in proximity to the magnet is employed. The MR sensor 24 detects changes in the magnetic flux caused by the rotation of the magnetized part of the rotor and produces an analog signal having a frequency proportional to the angular velocity of the capstan motor 20. The frequency signals produced by MR sensor 24 are wave-shaped by a waveform shaping circuit 25 so as to be supplied as bistable square wave pulses FG to a micro-controller 22.

The micro-controller 22 functions as a frequency-voltage transducer that temporally measures the period of the FG pulse, based on its interrupt function of interruption with a rise timing of the FG pulse and an edge timing storage function. The micro-controller 22 detects the rotation velocity of the capstan motor 20 and feeds back velocity information to the drive circuit 21 to cause the tape to run at a constant velocity by way of speed servo control of the capstan motor 20.

The frequency-voltage transducer, or so-called FV converter, is widely employed as a frequency measurement unit for measuring the signal frequency translated into a corresponding voltage or as a velocity detection unit for detecting the rotational velocity of a motor, translated into an electrical voltage from frequency signals (FG pulses) proportional to the rotation velocity of the motor.

As shown in FIG. 11, the frequency-voltage transducer formed by the microcontroller 22 is made up of a period measurement unit 31 and a time/voltage converting unit 32. The period measurement unit 31 detects the time required for each period and the converting unit 32 converts a reciprocal of the detected period into an electrical voltage, which is the converted output Vs of FIG. 1.

Meanwhile, with the above-described frequency-voltage converter the reciprocal of the period of the frequency signals is directly translated into the corresponding electrical voltage, so that an instantaneous frequency of the signal cannot be detected and only the mean frequency may be detected with a delay equal to one period.

With the velocity detection unit employing such a frequency-voltage transducer, the tape running velocity as detected assumes discrete values and represents a mean velocity averaged over a period of the FG pulse signal. Consequently, with the conventional velocity detection unit, the calculated tape running velocity becomes less than the actual velocity during acceleration and greater than the actual velocity during deceleration.

In order to carry out control of acceleration and deceleration of the tape running speed with high accuracy in a tape drive system such as a video tape recorder, it is necessary first to correctly detect the tape running velocity. Nevertheless, with the conventional velocity detection unit as described above, only the mean velocity over a period of the FG pulse signal is obtained, so that the instantaneous velocity cannot be detected.

In general, a pinch roller for holding the tape in association with the capstan is provided in the tape drive system of the video tape recorder. The capstan is rotated at a constant velocity by a capstan motor, which is typically a DC motor rotating at a constant velocity. A voltage velocity signal indicating the rotation velocity of the capstan, that is, the tape running speed, is derived from the FG pulses that have a frequency proportional to the rotation velocity of the capstan motor. This speed signal is fed back to the driving circuit to cause the tape to run at a constant speed by way of servo control of the capstan motor velocity.

On the other hand, in such a tape drive system for a video tape recorder a capstan motor start-and-stop operation is repeated for stepwise feed during the low-speed playback mode. For this stepwise feed, a constant DC voltage of around +5 V is applied to start the capstan motor.

Meanwhile, if the constant voltage is applied to start the capstan motor, because the output torque of the capstan motor is constant, the starting characteristics of the capstan motor must change with changes in the motor load. Consequently, with the conventional video tape recorder the tape feed quantity by the stepwise feed for the low-speed playback mode changes, so that an identical head tracing cannot always be made. On the other hand, it has been necessary to cope with fluctuations in load or temperature characteristics from one version to another, or from one mechanical deck to another of the same model or version, by performing an operation of matching constants for a driving system of a capstan motor, such as the period during which the constant voltage is impressed.

OBJECTS AND SUMMARY OF THE INVENTION

In view of the above-depicted status of the art, it is an object of the present invention to provide a frequency-voltage transducer adapted for outputting a voltage indicating an instantaneous frequency at the end of a period of a pulsed signal having a frequency related to a velocity of moving objects.

It is another object of the present invention to provide a velocity detection device for producing a detection output indicating an instantaneous velocity at an end time point of a FG pulse period in order to perform accurate control of acceleration and deceleration of tape running in a tape running system of a video tape recorder.

Also, in view of the above-depicted status of the previously proposed tape running systems for video tape recorders, it is a further object of the present invention to enable a capstan motor to be driven with constant start or stop characteristics despite fluctuations in load or variations in temperature.

In overcoming the above-mentioned problems, one aspect of the present invention provides a frequency-voltage transducer comprising period detection means for detecting the period of an input frequency signal, correction means for finding the rate of change of the reciprocal of the value detected by the period detection means and for correcting the reciprocal based on the determined rate of change, and transducer means for translating the reciprocal of the period corrected by the correction means into an electrical voltage.

Another aspect of the present invention also provides a velocity detection device comprising frequency signal generating means for generating a frequency signal having a frequency proportional to the velocity of the moving object, and instantaneous velocity estimating means for finding an acceleration from a mean velocity obtained as a reciprocal of a period of the frequency signal supplied from the frequency signal generating means and estimating an instantaneous velocity based on the acceleration.

The present invention also provides a velocity detection device, wherein the instantaneous velocity estimating means estimates an instantaneous velocity vn at a time tn+1 of detection in the period Tn of the frequency signal supplied from the frequency signal generating means by:

$$vn=1/Tn+(Tn-1-Tn)/Tn-1 \ (Tn-1+Tn).$$

The present invention further provides a drive control method for a capstan motor comprising the steps of detecting the acceleration of the capstan motor based on a FG pulse and controlling a driving voltage based on the acceleration information for starting or stopping the capstan motor at a constant acceleration.

The present invention also provides in another aspect a drive control method for a capstan motor comprising detecting the acceleration of the capstan motor at the time of starting based on a FG pulse and controlling a driving voltage based on acceleration information for starting the capstan motor at a constant acceleration.

The present invention also provides a drive control method for a capstan motor comprising the steps of detecting the acceleration of the capstan motor at the time of stating, storing the detected acceleration, and controlling the driving voltage at the next starting time based on the stored acceleration, so that the capstan motor is started with a constant acceleration.

With the above-mentioned drive control method for the capstan motor according to the present invention, the acceleration is found from a mean velocity obtained as a reciprocal of a period of a FG pulse and an instantaneous velocity is estimated based on the derived acceleration to control the drive voltage of the capstan motor.

With the frequency-voltage transducer according to the present invention, the period of the input frequency signal is detected by period detection means, a reciprocal of the detected period is corrected by correction means based on the rate of change of the reciprocal of the detected period, and the corrected, reciprocal period is translated by transducer means into an electrical voltage.

With the velocity detection device according to the present invention, an acceleration is found by instantaneous velocity estimating means from a mean velocity obtained as a reciprocal of a period of a frequency signal having a frequency proportional to the velocity of a moving object, supplied from frequency signal generating means, and an instantaneous velocity is estimated based on the determined acceleration.

With the velocity detection device according to the present invention, the instantaneous velocity estimating means estimates an instantaneous velocity vn at a time point tn+1 on a detection period Tn of the frequency signal supplied from the frequency signal generating means.

With the drive control method for the capstan motor according to the present invention, the acceleration of the capstan motor is detected based on the FG pulse and the drive voltage is controlled based on the acceleration information, so that the motor is started with a constant acceleration.

In the drive control method for the capstan motor according to the present invention, the acceleration of the capstan motor is detected at the motor starting time based on the FG pulse and the driving voltage is controlled based on the acceleration information for starting the motor at a constant acceleration.

The driving controlling method for the capstan motor of the present invention detects the acceleration of the capstan motor at the motor starting time, stores the corresponding acceleration information, and controls the drive voltage based on the stored acceleration information, so that the next time the motor is started it has a constant acceleration.

With the driving controlling method for the capstan motor according to the present invention, the acceleration is found from a mean velocity obtained as a reciprocal of a period of the FG pulse signal and an instantaneous velocity is estimated based on the acceleration to control the driving voltage of the capstan motor.

DETAILED DESCRIPTION OF PREFERRED EMBODIMENTS

Figure 1:
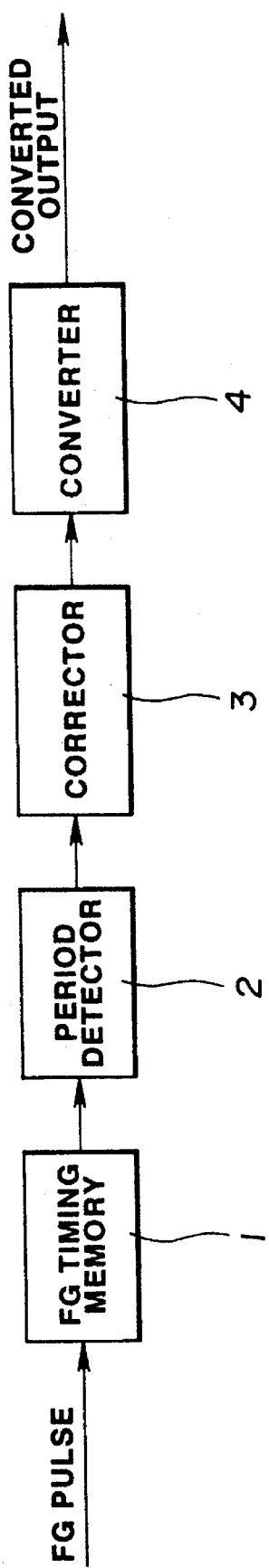
FIG. 1 is a block diagram showing an arrangement of a frequency-voltage transducer according to the present invention.

Referring to the drawings, preferred embodiments of a frequency-voltage transducer, velocity detection device, and a capstan motor drive control device according to the present invention will be explained in detail. More specifically, the frequency-voltage transducer according to the present invention is shown in FIG. 1, in which the frequency-voltage transducer is made up of a memory 1, a period detector 2, a corrector 3, and a converter 4. In the frequency-voltage transducer, the memory 1 stores the time tn of a rising edge of a FG pulse fed thereto.

Figure 2:
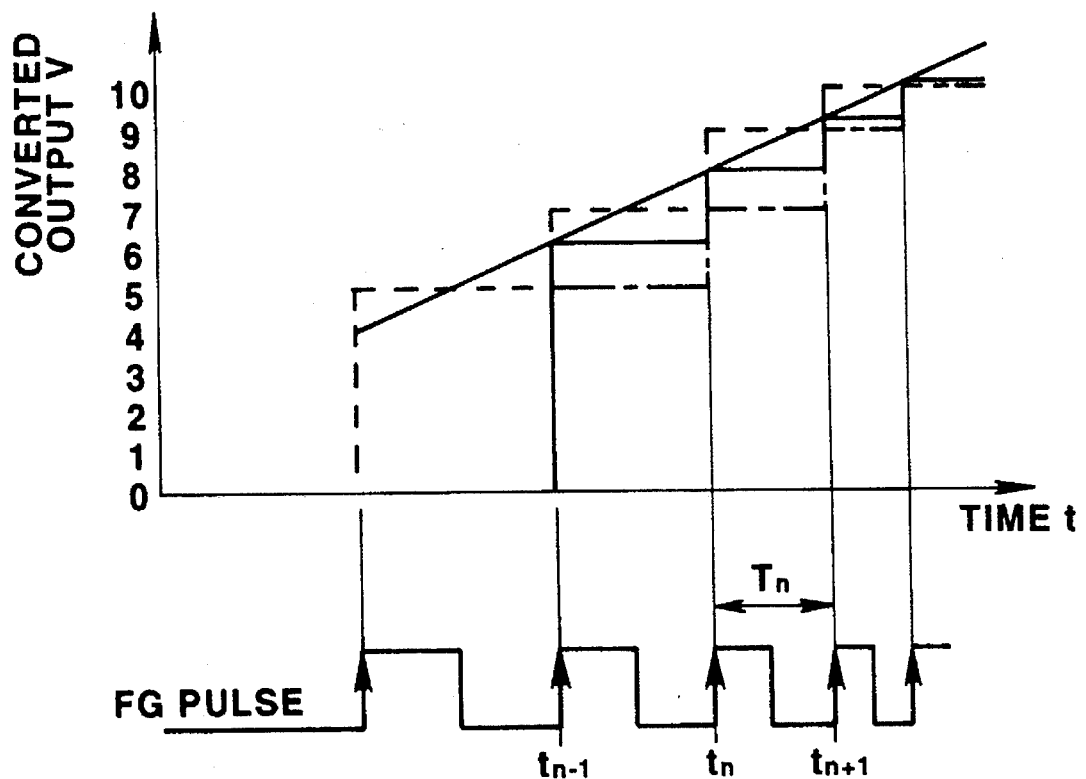
FIG. 2 is a chart illustrating the operation of the frequency-voltage transducer shown in FIG.1.

The period detector 2 detects a period Tn of the FG pulses from each of the successive times stored in memory 1. If a reciprocal 1/Tn of the FG pulse period detected by the period detector 2 is directly translated into a voltage, then a step-shaped transduced voltage as shown by the chain-dotted line in FIG. 2 is produced.

The corrector 3 finds the rate of change of the reciprocal of the period (1/Tn) of the FG pulse, as detected by the period detector 2, that is, the rate of change of the frequency, and corrects the reciprocal of the period (1/Tn) based on such rate of change. This results in the reciprocal of the period (1/Tn') indicating an instantaneous frequency fn at a time point of detection tn+1 with the period Tn.

This method of correction is the same as that used to determine instantaneous velocity in a speed detection device which will be explained hereinbelow. That is, the method of correction may be represented in general by:

$$1/Tn' = 1/Tn + (Tn-1-Tn)/Tn-1 \ (Tn-1+Tn)$$

The converter 4 converts the reciprocal of the period 1/Tn' as corrected by the corrector 3, into an electrical voltage, for outputting a voltage Vn indicating the instantaneous frequency fn at the time point of detection tn+1 of the period Tn. The converted output from the converter 4 becomes a step-shaped output, as shown by the solid line in FIG.2.

Because the frequency-voltage conversion of the illustrated embodiment has the memory 1 for storing the time of occurrence tn of the rising edge of the input FG pulse, each instantaneous frequency may be interpolated at the correction unit 3 by interpolation based on the reciprocal of the FG pulse period 1/Tn, as detected by the period detector 2, that is, the rate of change of the frequency, for enabling the continuous output to be issued from the converter 4, as shown by the solid line in FIG. 2. If the processing is not real-time processing, the period Tn of the input FG pulse may also be detected with a phase lead at the period detection unit 2 for producing a step-shaped translated output as indicated by the broken line in FIG. 2.

Figure 3:
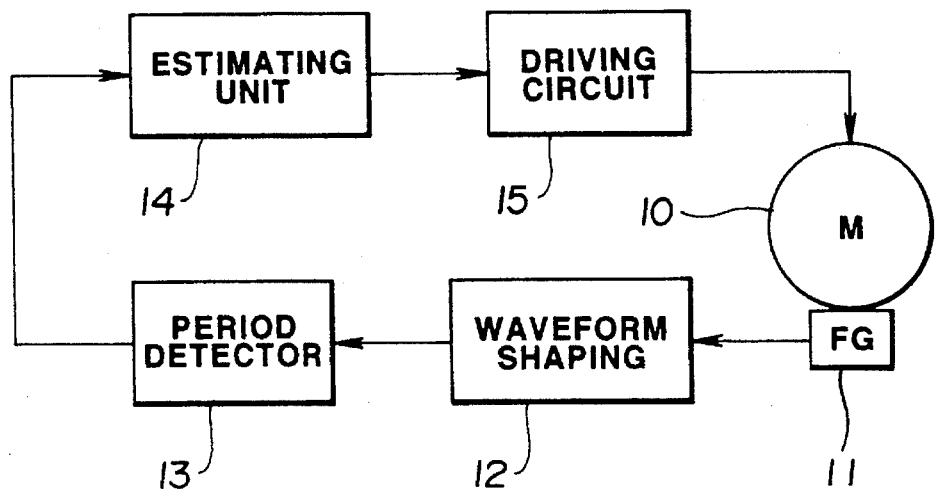
FIG. 3 is a block diagram showing an arrangement of a velocity detection device according to the present invention.

The speed detection device according to the present invention may be arranged as shown for example in FIG. 3, in which the speed detection device is adapted for detecting the rotational speed of a motor 10 and includes a frequency signal generator 11 for generating pulses having a frequency proportional to the rotation velocity of the motor 10, a period detector 13 supplied with a pulsed signal FG from the frequency signal generator 11 via a waveform shaping circuit 12, an estimating unit 14 supplied with the period information from the period detector 13, and a driving circuit 15 supplied with an estimation signal from the estimating circuit 14.

In the above-depicted velocity detecting device, the period detection unit 13 detects the period Tn of the FG pulse based on the timing of each rising edge of the successive FG pulses supplied thereto from the frequency signal generator 11 via the waveform shaping circuit 12.

The estimating unit 14 finds the reciprocal (1/T) of the period of the FG pulses detected by the period detector 13, that is, the rate of change of the rotation velocity and based on this rate of change estimates a reciprocal of a period 1/Tn' indicating an instantaneous velocity vn at the time point tn+1 of the period Tn.

The converter 15 translates the reciprocal of the period 1/Tn' as estimated by the estimating unit 14 to output a voltage Vn indicating an instantaneous velocity vn at the detection point tn+1.

Figure 4:
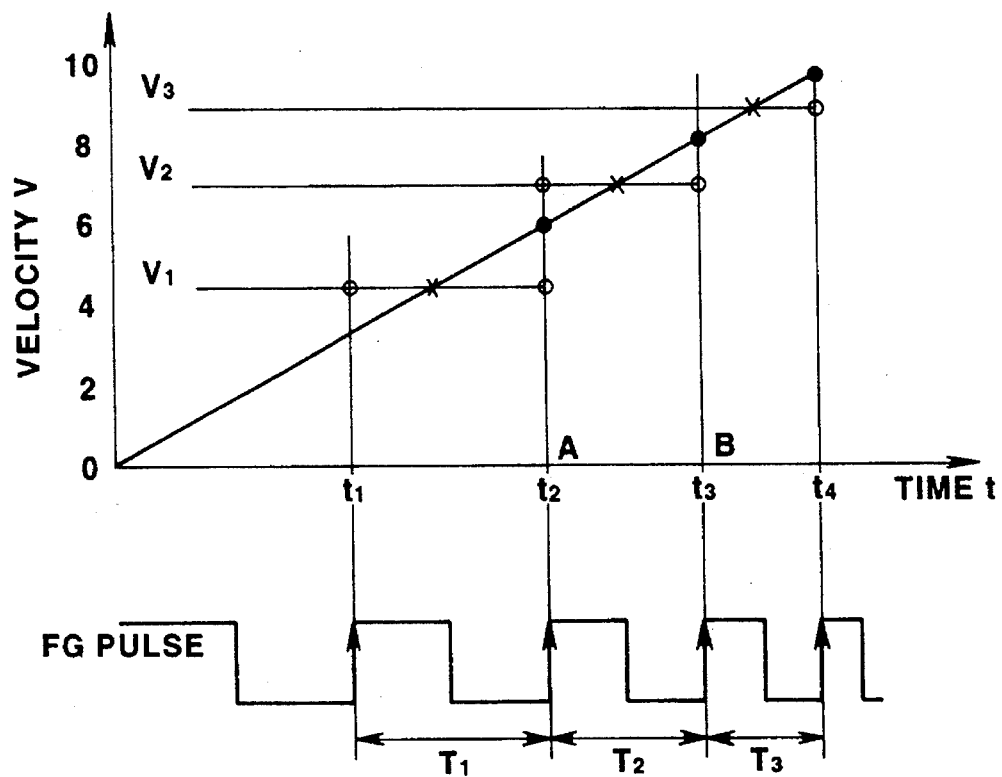
FIG. 4 is a chart illustrating the operation of the velocity detection device shown in FIG.3.

Taking an illustrative case in which the motor 10 is started with a constant acceleration as shown in FIG.4, the operation of the present velocity detection device is explained.

The mean velocity V1 during the period T1 of the FG pulse signal, which is the time difference between the time t1 of the first rising edge and the time t2 of the second rising edge of the FG pulse, is found as a reciprocal of the first period T1, by the equation:

$$\begin{aligned} V1 &= 1/(t2-t1) \\ &= 1/T1 \end{aligned}$$

On the other hand, the motor 10 is started at a constant acceleration, so that taking the velocity at a midpoint between t1 and t2 as V1, the acceleration $\alpha$ is:

$$\begin{aligned} \alpha &= V1/(t1+t2)/2 \\ &= 2/(t1+t2)(t2-t1) \end{aligned}$$

The instantaneous velocity VA at time A at which the period detector 13 has detected the first period T1, that is, at a time t2 of the second rising edge, may be estimated as:

$$\begin{aligned} VA &= \alpha t2 \\ &= 2t2/(t1+t2)(t2-t1) \end{aligned}$$

Then, assuming that the acceleration since the time t1 of the first rising edge until the time t3 of the third rising edge is constant, the acceleration may be found from the velocity V1 at a midpoint between the time t1 of the first rising edge and the time t2 of the second rising edge of V1=1/(t2−t1)= 1/T1 and the velocity v2 at a midpoint between the time t2 of the second rising edge and the time t3 of the third rising edge of V2=1/(t3−t2)=1/T2 by:

$$\begin{aligned} \alpha &= v2-v1/(t3-t1)/2 \\ &= 2(1/T2-1/T1)/(T1+T2) \\ &= 2(T1-T2)/T1T2(T1+T2) \end{aligned}$$

On the other hand, the instantaneous velocity VB at a time point B at which the period detector 13 has detected the second period T2, that is, at a time t3 of the third rising edge, may be estimated by:

$$\begin{aligned} VB &= V2 + \alpha(t3-t2)/2 \\ &= 1/T2 + (T1-T2)/T1(T1+T2) \end{aligned}$$

That is, the instantaneous velocity Vn of the FG pulse at time tn+1, when the period detector 13 has detected the period Tn, may be estimated by the estimating unit 14 by:

$$Vn = 1/Tn + (Tn-1-Tn)/Tn-1 \ (Tn-1+Tn).$$

It should be noted that the velocity detection device according to the present invention may be applied not only to rotation control of a capstan motor but also to position control of an object that is moved linearly, for example, by a linear motor.

Figure 6:
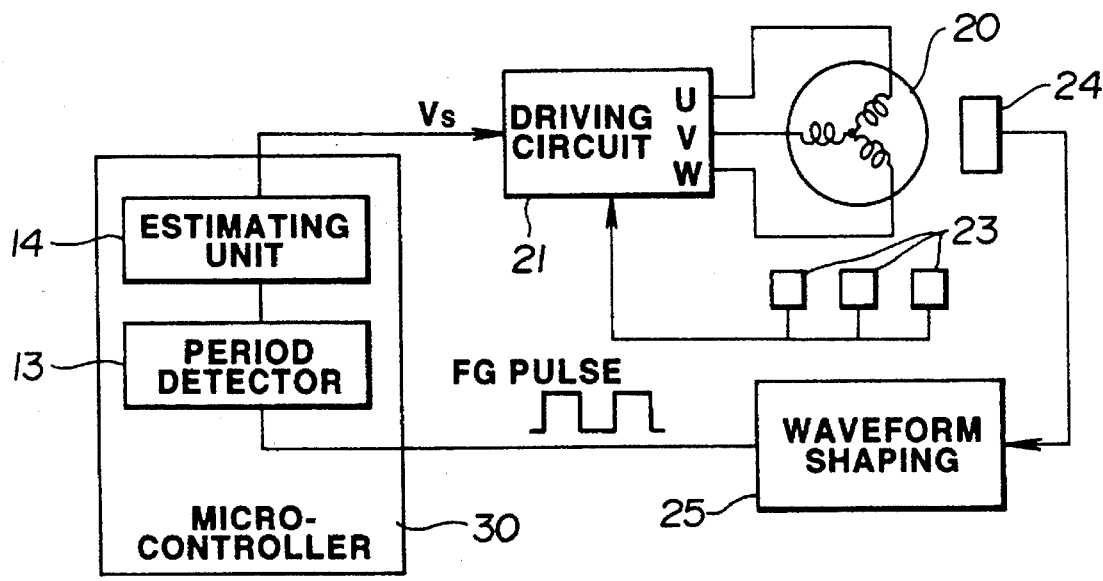
FIG. 6 is a block diagram showing a servo system for a capstan motor in a tape running system in a video tape recorder according to the present invention.

Another embodiment of the capstan motor control device according to the present invention is shown in FIG. 6, in which parts or components that are the same as those of the previous embodiment are indicated by the same reference numerals and the corresponding description is omitted for simplicity.

In FIG. 6 a micro-controller 30 performs the control operation for starting a capstan motor 20 in the following manner. A control voltage Vs is supplied to the driving circuit 21 to start the operation of capstan motor 20. By an interrupt function in which an interrupt is performed at a rising edge of the FG pulse signal, timing data indicating such timing is stored at an interrupt time #0, shown in FIG. 7. At the next interrupt time #1, timing data indicating that interrupt time is stored at the same time that the velocity information indicating the velocity at the current time is produced using the stored timing data and the above-mentioned #0 interrupt timing data. At the next interrupt #2, timing data indicating that interrupt time is stored at the same time that the velocity information indicating the velocity at the current time is produced using the stored timing data and the above-mentioned #1 interrupt timing data, and current acceleration data is produced from the velocity information at the current time and the #0 interrupt velocity information. An error between the produced acceleration information and command acceleration is found by proportional control to output the next control voltage Vs.

By following this sequence of operations the acceleration at the start of rotation of the capstan motor 20 follows the command acceleration to allow the capstan motor 20 to be started with a constant acceleration.

Figure 7:
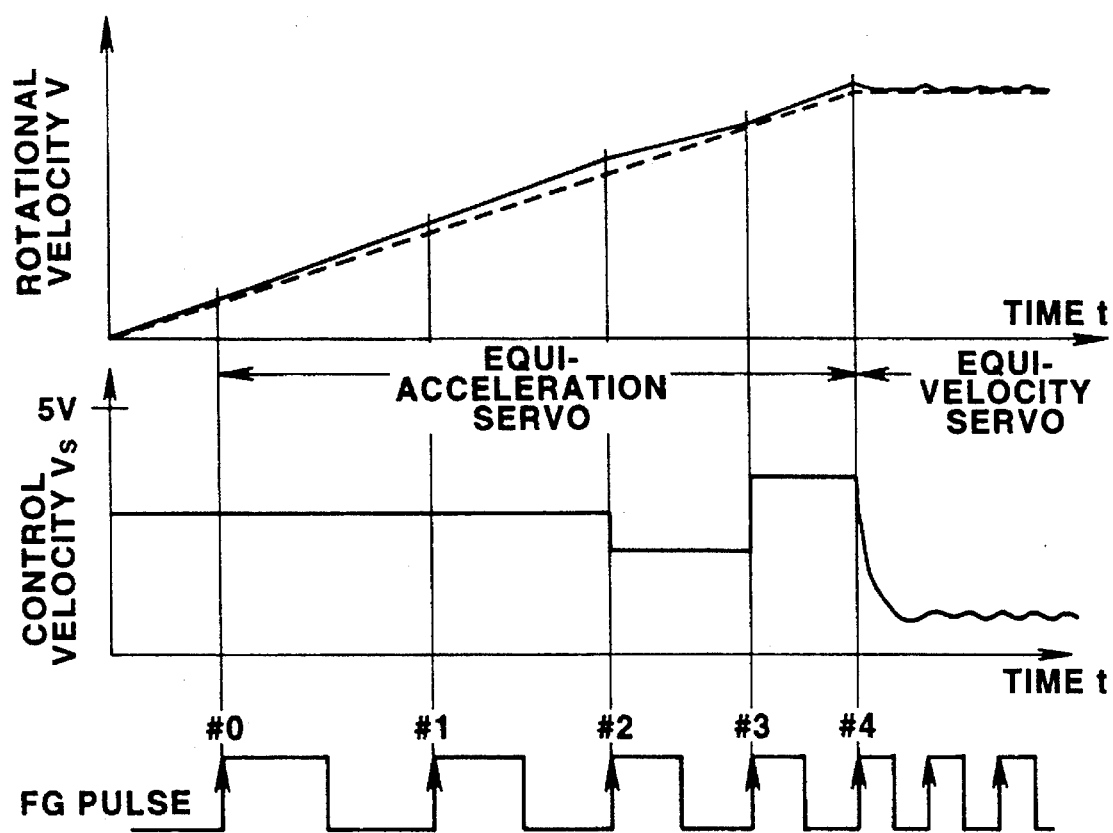
FIG. 7 is a chart showing starting characteristics of the capstan motor in the servo system of FIG. 6.

By starting the capstan motor 20 in this manner the acceleration to reach a target velocity can be constant at all times, regardless of the load and regardless of temperature characteristics of the system. The command velocity pattern for the capstan motor 20 is shown in FIG.7 by the broken line.

Figure 5:
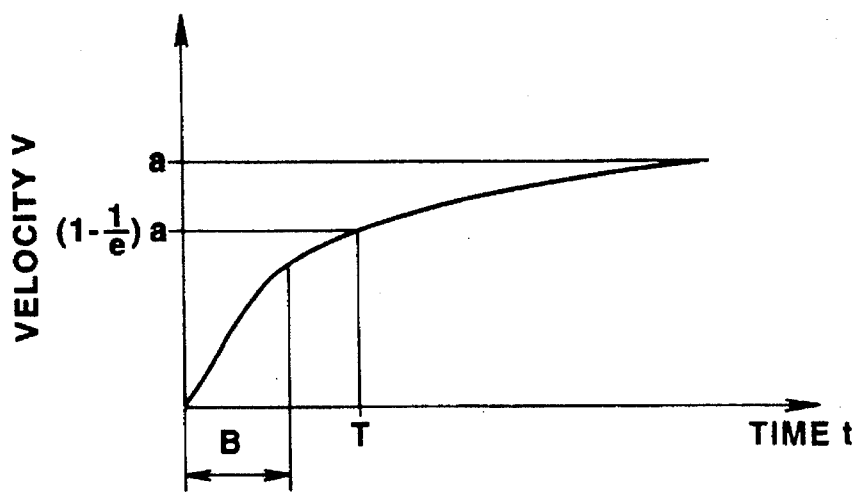
FIG. 5 is a response curve illustrating starting characteristics of a dc motor.

The micro-controller 30 in FIG. 6 is changed over from the equal acceleration servo control to an equal speed servo control at a time when the capstan motor 20 has reached the command velocity. If capstan motor 20 is a DC motor, then the velocity V(t) of the motor on application of a constant voltage is:

$$v(t) = a(1 - e^{-t/T})$$

where a indicates gain and T delay. As shown in FIG. 5, the starting characteristics are substantially linear for a lowvelocity range represented at B.

Thus, the actual acceleration at the starting time of the capstan motor 20 may be detected by the micro-controller 30 in the same manner as with the above-described embodiment for the velocity detection device.

That is, an acceleration a at a detection timing tn+1 of the period Tn may be found by $$\alpha = Vn - Vn - 1/(tn + 1 - tn - 1)/2$$
$$= 2(1/Tn - 1/Tn - 1)/(Tn - 1 + Tn)$$
$$= 2(Tn - 1 - Tn)/Tn - 1\,Tn(Tn - 1 + Tn)$$

It should be noted that, using the above-described micro-controller 5, with the period Tn of the FG pulse at the detected time of rising edge tn+1, the instantaneous velocity Vn may be estimated by:

$$Vn = Vn + \alpha(tn + 1 - tn)/2$$
$$= 1/Tn + (Tn - 1 - Tn)/Tn - 1(Tn - 1 + Tn)$$

If the velocity error with respect to the command velocity of each instantaneous velocity, as indicated by the black circles in FIG.4, is fed back to the driving circuit 21 the capstan motor 20 may be started with a constant acceleration.

Figure 8:
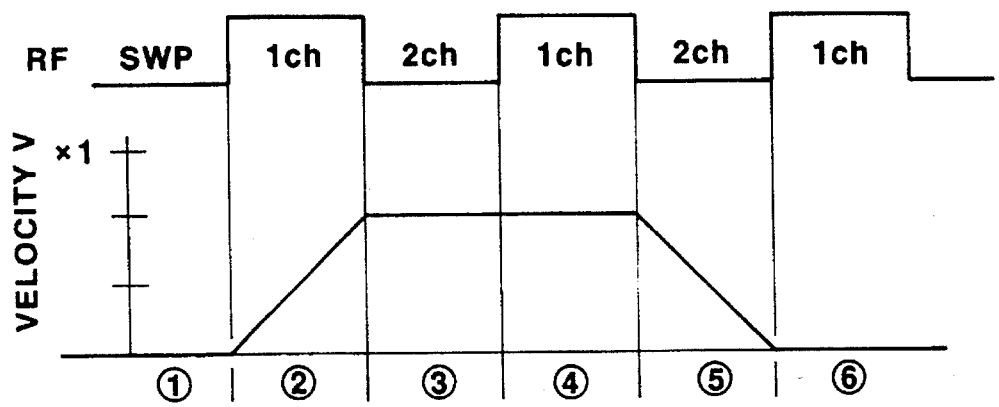
FIG. 8 is a chart illustrating the velocity control operation for stepwise tape feed with the capstan motor of FIG. 6.

Meanwhile, with the present servo system it is possible for the micro-controller 30 to perform a predetermined deceleration control with a constant negative acceleration, as in the case of the acceleration control at the start of rotation of the capstan motor 20. The capstan motor 20 is controlled for acceleration or deceleration at a constant acceleration during a low-speed playback mode, as shown in FIG.8, to effect a step-like tape feed. During such operation, the tape is fed by two fields for each step and the acceleration or deceleration control is performed within one field. During this time, the tape is fed at a constant velocity equal to two-thirds of the normal tape velocity.

Figure 9:
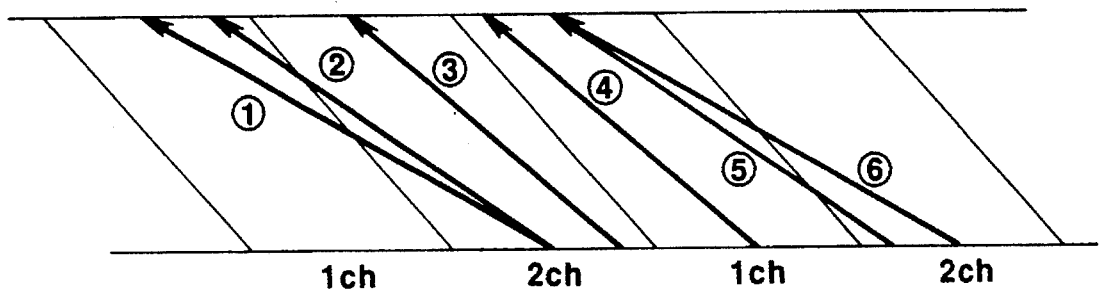
FIG. 9 is a chart showing a trace pattern by a rotary head for stepwise tape feed with the capstan motor of FIG. 6.
Figure 10:
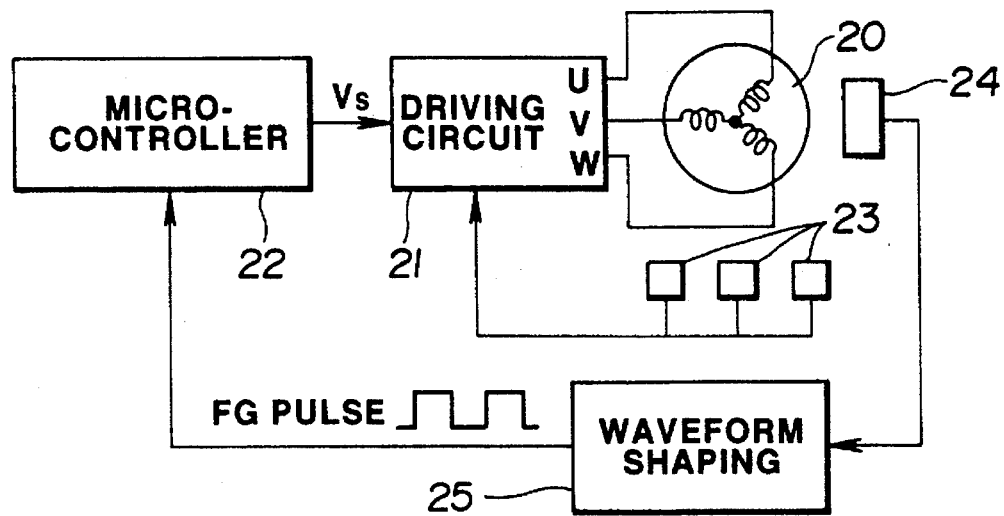
FIG. 10 is a block diagram showing an arrangement of a velocity control system for the capstan motor in a conventional video tape recorder.
Figure 11:
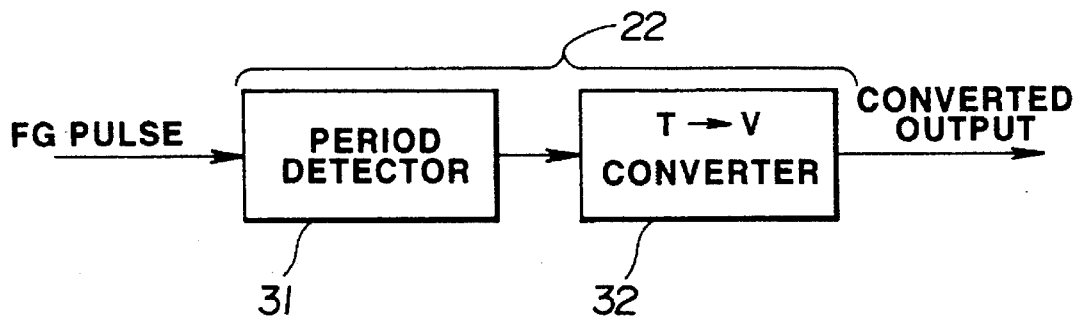
FIG. 11 is a block diagram showing a basic arrangement of a conventional frequency-voltage transducer in the conventional system of FIG. 10.

The tracing pattern by a rotary head for the stop period (1), the period of accelerated travel (2), periods of constant-velocity travel (3) and (4), the period of decelerated travel (5), and the stop period (6), is shown in FIG.9 and corresponds respectively to the velocity changes shown in FIG. 8.

By controlling the acceleration/deceleration of the capstan motor 20 at a constant acceleration for effecting stepwise tape feed, it becomes easy to correct the relative velocity between the capstan motor and the rotary head drum to improve the playback picture quality. Besides, the power necessary for driving the capstan motor may be reduced, while the possibility of damage to the tape may also be reduced because the force applied to the tape is smoothed or evened out.

In the above-described embodiment of the present invention, the acceleration is detected using the micro-controller 30 at the start of rotation of the capstan motor 20 based on the FG pulse signal, and the driving voltage is controlled based on the acceleration information for starting the capstan motor 20 at a constant acceleration. Alternatively, the acceleration may be detected by the micro-controller 30 and stored. Then at the time of starting the capstan motor 20, based on the FG pulse and stored acceleration information, the driving voltage is controlled for starting the capstan motor 20 at a constant acceleration. In this manner, it becomes possible to start the capstan motor 20 at a constant acceleration even in cases wherein the number of the FG pulses per rotation of the capstan motor 20 is small, as is the case with a small-sized VTR such as a 8-mm VTR.

With the frequency-voltage transducer according to the present invention, in which the period of the input frequency pulse signal is detected by period detection means, a reciprocal of the period is corrected by correction means based on the rate of change of the reciprocal of the detected period, and the reciprocal of the corrected period is converted into an electrical voltage, it is possible to produce an electrical voltage accurately indicating the instantaneous frequency at the end of a period of the frequency pulse signal.

Furthermore, with the frequency-voltage transducer according to the present invention, in which an acceleration of a moving object is found by instantaneous velocity estimating means from a mean velocity obtained as a reciprocal of the period of the frequency signal having a frequency proportional to the velocity of movement of the moving object supplied from frequency signal generating means and the instantaneous velocity is estimated based on the thus found acceleration, it is possible to produce a detection output accurately indicating the instantaneous velocity at a time when each period of the FG pulse signal comes to an end. Consequently, by applying the present velocity detection device to rotation control of the capstan motor, it is possible to effect accurate acceleration or deceleration control of tape travel in a tape drive system, such as a video tape recorder.

With the capstan motor drive control method according to the present invention, by detecting the acceleration of the capstan motor based on the FG pulse, and by controlling the driving voltage, based on the acceleration information, it is possible to start or stop the capstan motor at a constant acceleration.

Besides, with the capstan motor drive control method according to the present invention, by detecting the acceleration of the capstan motor based on the FG pulse at the time of starting of the capstan motor, and by controlling the driving voltage based on the detected acceleration information, it is possible to start the capstan motor with a constant acceleration.

In addition, with the capstan motor drive control method according to the present invention, by detecting the acceleration of the capstan motor based on the FG pulse at the time of starting of the capstan motor, storing the detected acceleration, and by controlling the driving voltage based on the stored acceleration information, it is possible to start the capstan motor at a constant acceleration.

Consequently, with the method of the present invention, the capstan motor may be driven with constant starting or stopping characteristics despite fluctuations in the load of the tape running system or variations in temperature.

What is claimed is:

1. A capstan motor drive control system comprising:

period detection means for detecting a period of a pulsed input signal having a frequency which is a function of a rotational velocity of a capstan motor;

correction means for determining a rate of change of a reciprocal of the period detected by said period detection means and employing said rate of change to produce a corrected reciprocal indicating on instantaneous frequency at a time of detection within said period, and converter means for converting the corrected reciprocal into an electrical voltage for controlling the rotational velocity of the capstan motor.

2. A drive control system comprising:

pulse signal generating means for generating successive pulse signals having a frequency proportional to a velocity of a moving object;

a memory storing a time of occurrence of a rising edge of each pulse;

means for determining periods of said pulse signals supplied from said pulse signal generating means using stored times from said memory;

corrector means for finding reciprocals of said periods representing a series of instantaneous velocities and a continuously updated instantaneous velocity; and means for converting the instantaneous velocity into a drive control voltage for controlling movement of the moving object.

3. The drive control system as claimed in claim 2 wherein said determining means estimates an instantaneous velocity $Vn$ at a time $tn+1$ of a period $Tn$ of the frequency signal supplied from said pulse signal generating means by:

$$Vn=1/Tn+(Tn-1-Tn)/Tn-1\ (Tn-1+Tn).$$

4. A drive control method for a capstan motor comprising steps of:

producing a series of pulse signals FG representing a rotational rate of the capstan motor;

calculating a series of accelerations of the capstan motor based on the FG pulse signals; and controlling a drive voltage to the capstan motor as a function of the calculated accelerations for maintaining them at a substantially constant value during starting or stopping of the capstan motor.

5. A drive control method for a capstan motor comprising steps of:

producing a series of pulse signals FG representing a rotational rate of the capstan motor;

employing the FG pulse signals to calculate acceleration of the capstan motor at a time of starting thereof; and employing the calculated acceleration to control a capstan motor drive voltage for maintaining the acceleration of the capstan motor substantially constant during starting thereof.

6. A drive control method for a capstan motor comprising steps of:

employing FG pulse signals to calculate acceleration of the capstan motor at a given time of starting thereof;

storing the calculated acceleration; and controlling a drive voltage at a subsequent starting time immediately following said given starting time as a function of the stored acceleration for starting the capstan motor at a constant acceleration.

7. The drive control method for a capstan motor as in claims 4, 5, or 6 comprising the steps of finding the acceleration from a mean velocity obtained as a reciprocal of a period of the FG pulse signal; and employing the acceleration to estimate an instantaneous velocity to control the drive voltage of the capstan motor.

* * * * *